(12) United States Patent
Rosenbrock et al.

(10) Patent No.: US 12,224,799 B1
(45) Date of Patent: *Feb. 11, 2025

(54) SOLAR IRRADIANCE MITIGATION IN SATELLITE OPTICAL COMMUNICATION

(71) Applicant: Lockheed Martin Corporation, Bethesda, MD (US)

(72) Inventors: Matthew Henry Rosenbrock, Livermore, CA (US); Neil Evan Goodzeit, Devon, PA (US); Harald J. Weigl, Centennial, CO (US); Joseph F. Eder, Los Altos, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,391

(22) Filed: Dec. 14, 2023

Related U.S. Application Data

(63) Continuation of application No. 17/711,154, filed on Apr. 1, 2022, now Pat. No. 11,888,519.

(51) Int. Cl.
 *H04B 10/00* (2013.01)
 *H04B 7/185* (2006.01)
 *H04B 10/118* (2013.01)

(52) U.S. Cl.
 CPC ....... *H04B 10/118* (2013.01); *H04B 7/18521* (2013.01); *H04B 7/18547* (2013.01)

(58) Field of Classification Search
 CPC ..... H04B 10/118; H04B 10/11; H04B 10/112; H04B 10/1123; H04B 10/1125; H04B 10/1127; H04B 10/1129; H04B 10/114; H04B 10/1143; H04B 10/1149; H04B 10/40; H04B 7/18521; H04B 7/18547

USPC ....... 398/118, 119, 120, 121, 122, 123, 124, 398/125, 126, 127, 128, 129, 130, 131, 398/135, 136, 158, 159, 115
See application file for complete search history.

(56) References Cited

U.S. PATENT DOCUMENTS

| | | | |
|---|---|---|---|
| 4,912,656 | A | 3/1990 | Cain et al. |
| 5,467,345 | A | 11/1995 | Cutler, Jr. et al. |
| 5,471,641 | A | 11/1995 | Dosiere et al. |
| 5,722,042 | A | 2/1998 | Kimura et al. |
| 6,178,163 | B1 | 1/2001 | Yuan et al. |
| 6,512,920 | B1 | 1/2003 | Yaoya |

(Continued)

FOREIGN PATENT DOCUMENTS

| | | |
|---|---|---|
| CN | 112019258 A | 12/2020 |
| EP | 0887656 B1 | 11/2000 |
| EP | 3763083 A1 | 1/2021 |

*Primary Examiner* — Hanh Phan

(57) ABSTRACT

Provided herein are various enhanced systems, apparatuses, and techniques for optical communication among a constellation of satellites. One example includes establishing an initial cross-connect configuration comprising optical communication links among a constellation of satellites. In the initial cross-connect configuration, the satellites can optically communicate with both adjacently positioned and non-adjacently positioned satellites in the constellation. The satellites obtain angular states of the optical communication links resultant from orbital motion of the satellites. When angular states of a portion of the optical communication links reach an exclusion range, the satellites establish a subsequent cross-connect configuration to avoid optically communicating within the exclusion range.

20 Claims, 10 Drawing Sheets

(56) References Cited

U.S. PATENT DOCUMENTS

| | | |
|---|---|---|
| 7,379,673 B2 | 5/2008 | Krill et al. |
| 7,502,382 B1 | 3/2009 | Liu et al. |
| 8,730,864 B2 | 5/2014 | Natarajan et al. |
| 9,042,734 B2 * | 5/2015 | Makowski ......... H04B 10/1123 |
| | | 398/118 |
| 9,379,815 B2 | 6/2016 | Coleman et al. |
| 9,998,207 B1 | 6/2018 | Coleman et al. |
| 10,505,623 B2 | 12/2019 | Metzger et al. |
| 10,512,021 B2 | 12/2019 | Chong et al. |
| 10,630,378 B2 | 4/2020 | Coleman et al. |
| 10,645,133 B2 | 5/2020 | Barritt et al. |
| 10,812,185 B2 | 10/2020 | Barritt |
| 11,888,519 B1 * | 1/2024 | Rosenbrock ....... H04B 7/18521 |
| 2002/0150060 A1 | 10/2002 | Montpetit |
| 2004/0157598 A1 | 8/2004 | Parkman |
| 2016/0065308 A1 * | 3/2016 | Coleman ............. H04B 10/118 |
| | | 398/79 |
| 2016/0182140 A1 | 6/2016 | DeVaul et al. |
| 2021/0226694 A1 | 7/2021 | Cherrette |
| 2022/0303008 A1 * | 9/2022 | Takemoto .......... H04B 7/18521 |

\* cited by examiner

| Configuration Table 300 | Configuration 301 | Re-config. Step 302 | Re-config. Step 303 | Re-config. Step 304 | Re-config. Step 305 | Configuration 306 |
|---|---|---|---|---|---|---|
| Satellite 112 | Links: 120 122 | Links: 120 116 | Unchanged | Unchanged | Unchanged | Links: 120 116 |
| Satellite 114 | Links: 122 118 | Unchanged | Unchanged | Links: 116 118 | Unchanged | Links: 116 118 |
| Satellite 116 | Links: 118 120 | Links: 112, 118 120 | Links: 112, 118 | Links: 112, 118 114 | Links: 112 114 | Links: 112 114 |
| Satellite 118 | Links: 114 116 | Unchanged | Unchanged | Unchanged | Links: 114 122 | Links: 114 122 |
| Satellite 120 | Links: 116 112 | Unchanged | Links: 122 112 | Links: 120 | Unchanged | Links: 122 112 |
| Satellite 122 | Links: 112 114 | Links: 114 | Links: 114, 120 | Links: 120 | Links: 118 120 | Links: 118 120 |

FIGURE 3A

SOLAR IRRADIANCE MITIGATION IN SATELLITE OPTICAL COMMUNICATION

RELATED APPLICATIONS

This application is a continuation of, and claims priority to, U.S. patent application Ser. No. 17/711,154, entitled "OPTICAL COMMUNICATION SATELLITE CROSS-CONNECT," and filed Apr. 1, 2022.

TECHNICAL BACKGROUND

Optical communications, such as laser communications, are employed across a wide range of application areas, including satellite communications, telecommunications, wireless data transmissions, consumer electronics, traffic routing, and more. In orbital contexts, optical communications can occur between deployed satellites via optical relays onboard the satellites or between satellites and ground stations via optical down/up links. Often, satellite optical communications employ laser communication terminals (LCTs) to provide such relays and establish inter-satellite links. For example, satellites in the same orbit can form a constellation and communicate with adjacent neighbors to communicate data in a circulating, ring-like manner. However, in ring-style satellite communications, a portion of the optical receivers are occasionally aimed towards the Sun and associated solar radiation, which hinders detection of optical signals from adjacent neighbors. This can lead to connectivity loss, data loss, or excess noise in such signals. Moreover, the use of sun-facing solar panels on satellites can inhibit the optical aiming range of satellites within these ring-style satellite communications.

Overview

The examples discussed herein include improvements to systems and apparatuses that provide for optical communications within a constellation of orbital satellites. During orbit, the satellites are communicatively coupled in 'Z' shaped cross-connect configurations such that optical aiming elements of each satellite are configured to target both adjacently positioned and non-adjacently positioned satellites. As the satellites transit in orbit, the satellites each monitor indications of ephemeris, such as relative locations of the other satellites of the constellation and the Sun. Based on the monitored information, the satellites determine angular states of the aiming of optical communication links within a cross-connect configuration. When a satellite determines that an optical communication link is approaching an exclusion range, the satellites establish a different cross-connect configuration state to avoid optically communicating within the exclusion range. By utilizing various cross-connect configurations and state changes during orbit, solar interference with optical communications and line-of-sight obscuration can be reduced, while sun-facing arrays onboard the satellites can be maintained as facing the Sun, without interrupting or inhibiting solar radiation collection.

One example implementation includes a method of operation. The method includes establishing an initial cross-connect configuration for optical communication links among a constellation of satellites. The method further comprises obtaining angular states of the optical communication links within the initial cross-connect configuration resultant from orbital motion of the satellites, and responsive to the angular states for at least a portion of the optical communication links reaching an exclusion range, establishing a subsequent cross-connect configuration for the optical communication links that avoids the exclusion range for the optical communication links.

Another example implementation includes a system comprising a constellation of satellites that form an optical communication system among the satellites, wherein each satellite is configured to establish optical communication links with at least one other satellite among the constellation. In the system, the at least one other satellite is selected to avoid directing the optical communication links into an angular exclusion range resultant from orbital motion of the satellites.

In yet another example, an apparatus is provided. The apparatus comprises one or more computer-readable storage media and program instructions stored on the one or more computer-readable storage media executable by a processing device to direct the processing device to perform various functions. For instance, the program instructions direct the processing system to at least establish initial optical communication links with first satellites among a constellation of satellites, monitor angular states of the optical communication links, and responsive to the angular states indicating at least one optical communication link reaching an exclusion range resultant from orbital motion of the satellites, establish subsequent optical communication links with second satellites that avoids the exclusion range.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 3A, 3B, and 3C illustrate exemplary reconfiguration steps for optical communication links during transitions between cross-connect configurations in an implementation.

DETAILED DESCRIPTION

Discussed herein are several enhanced techniques, systems, and apparatuses related to optical communication among a constellation of satellites which can be deployed to an associated orbit or orbits around Earth or another central body. Each satellite in the constellation can comprise optical elements to establish optical communication links between other satellites, referred to as cross-connects. The optical communication links can be employed in cross-connect configurations such that the optical elements of each satellite target other satellites that are positioned both adjacently and non-adjacently in a constellation or shared orbit with respect to the communicating satellite. For example, the satellites can establish an initial cross-connect configuration that designates sets of optical communication links for each satellite to establish. While orbiting, the satellites use indications of the relative locations of the other satellites, based on satellite ephemeris data and sun ephemeris data, to determine angular states of the optical communication links within the initial cross-connect configuration. When at least one of the satellites determines that an optical communication link reaches an exclusion range, the satellites establish a subsequent cross-connect configuration to establish new sets of optical communication links that avoid optical communications aimed within the exclusion range.

Thus, various states or phases are established for optical communications among satellites in a constellation. These states each include a corresponding set of cross-connect relationships among the satellites, typically forming a 'Z' shape from the perspective of an overhead view of the constellation, although other cross-connect shapes are possible. Once a threshold condition is met, such as the angular state of an optical link for any of the satellites reaching an exclusion range, then the state or phase of optical cross-connect relationships are changed for the satellites within the constellation. A make-before-break arrangement can also be established, where the existing cross-connect links are configured to linger until new cross-connect links are established, or a staggering/sequence of individual link state changes can be established among individual satellites. This can help avoid interruptions to communications during the transition between cross-connect states.

The term range, as used herein for allowable ranges or exclusion ranges, can include a sweep angle within a two-dimensional plane, or can refer to a three-dimensional range or region defined by an angular metric. For example, the ranges can include angular regions that are flat, triangular, rectangular, conical, cubic, pyramidal, irregular, or have other shapes in two- or three-dimensions, and can be symmetric or asymmetric. For exclusion ranges, the angle can be centered on a Sun vector.

Figure 1:
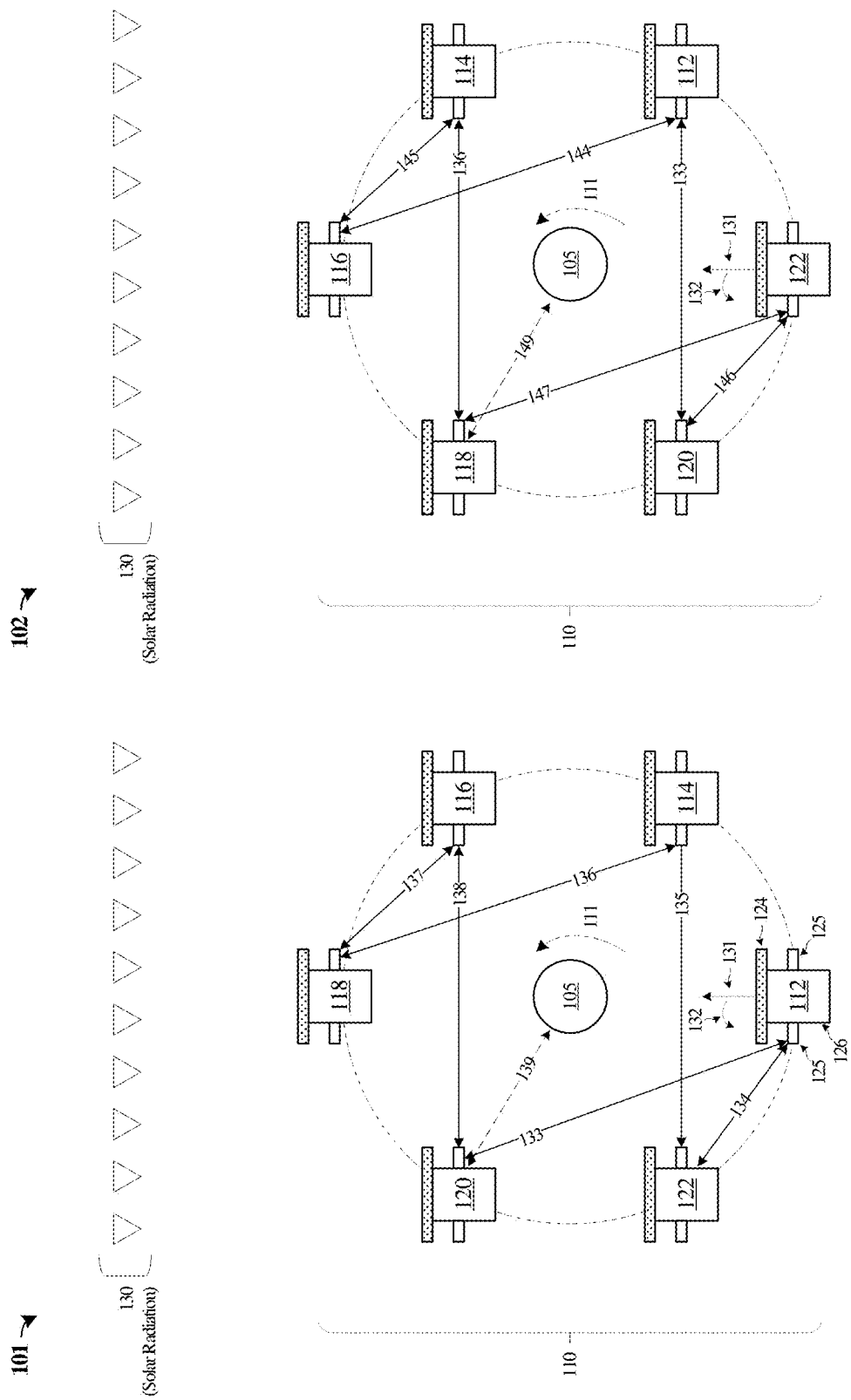
FIG. 1 illustrates example operating environments demonstrating optical communication links among satellites in cross-connect configurations in an implementation.

Turning now to the Figures, FIG. 1 includes operating environments 101 and 102 that illustrate optical communication links among satellites in two cross-connect configurations. Operating environment 101 includes Earth 105, satellite constellation 110 in orbit 111 around Earth 105 in an initial cross-connect configuration, and solar radiation 130. Satellite constellation 110 includes satellites 112, 114, 116, 118, 120, and 122 that communicate with each other via optical communication links 133, 134, 135, 136, 137, and 138 according to the initial cross-connect configuration and communicate with Earth 105 via ground link 139. Operating environment 102 depicts satellite constellation 110 at a different time and in a subsequent cross-connect configuration. In this subsequent cross-connect configuration, satellites 112, 114, 116, 118, 120, and 122 communicate with each other via optical communication links 133, 136, 144, 145, 146, and 147 according to the subsequent cross-connect configuration and communicate with Earth 105 via ground link 149.

In operating environment 101, satellite constellation 110 comprises six satellites, satellites 112, 114, 116, 118, 120, and 122 (collectively referred to as "the satellites"), in orbit 111 around Earth 105, although any suitable orbited body can be employed. The satellites are configured to perform various functions, such as capture solar radiation energy, communicate with each other according to cross-connect configurations, transmit communications to Earth 105, and receive communications from Earth 105.

While in orbit 111, the satellites maintain an orientation 131 with respect to solar radiation 130 such that the onboard solar arrays point at the Sun or at sun/solar vector projections in the orbit plane. Solar array 124 is shown for satellite 112, which is exemplary of corresponding solar arrays on the other satellites. The solar arrays are maintained generally perpendicular to incident solar radiation 130. Orientation 131 is shown for satellite 112 but is applicable to all the satellites with regard to incident solar radiation 130. Orientation 131 allows the onboard solar arrays of each satellite to maximize capture of solar energy. However, when solar arrays are sized above a certain area, the solar panels can physically occlude or block the aiming of satellite optical communication elements for certain orientations. In some systems, the satellites might be turned or oriented so as to not have the solar arrays perpendicular to incident solar radiation, however, this has the result of reducing the available incident solar energy for such satellites. In the examples herein, a perpendicular incident arrangement shown by orientation 131 is maintained throughout the orbital transit. Accordingly, each of the satellites are configured to establish cross-connect configurations to optically communicate with each other within an allowable angular range and outside an exclusion range. In various instances, the exclusion range may comprise a range of approximately 20 to 50 degrees offset from the direction of solar radiation 130. In some cases where the exclusion range is 30 degrees offset from the direction of solar radiation 130, it can form a 60 degree total exclusion range.

When establishing an initial cross-connect configuration, such as in operating environment 101, each satellite can obtain indications of ephemeris (e.g., satellite ephemeris data and/or sun ephemeris data) to determine at least a current position and a projected position of each satellite, among other information. For example, the indications of ephemeris allow satellite 112 to not only determine that satellites 114 and 122 are neighboring or adjacently positioned and that satellites 116, 118, and 120 are non-adjacently positioned satellites, but also calculate the trajectory of each of the other satellites or the position within the orbit with respect to an Earth-centered inertial coordinate frame. The indications further allow satellite 112 to determine the angular range (with respect to orientation 131) that it can point optical elements in when establishing the optical communication links with other satellites. Particularly, satellite 112 can calculate that optical communication link 133 are pointed towards satellite 120 at an angular state 132, which may denote a pointing angle, with respect to orientation 131, of an optical element onboard satellite 112 toward satellite 120.

With at least the information gathered or monitored from the indications of ephemeris, the satellites can compute relative position vectors between each of the other satellites in constellation 110. With this and information about the satellite inertial attitude based on star tracker or other sensor measurements, each of the satellites determine pointing angles, with respect to orientation 131, to establish an initial cross-connect configuration. The satellites might employ on-board tables or data structures which relate the ephemeris to desired cross-connect configurations that indicate which satellite devices are to be cross-connected. The satellites may employ various algorithms to dynamically compute aiming or pointing angles based on which satellites are to be cross-connected, and to maintain the cross-connect configuration as the satellites all transit through the orbit. In the initial cross-connect configuration, satellite 112 and satellite 120 communicate via optical communication link 133, satellite 114 and satellite 122 communicate via optical communication link 135, satellite 116 and satellite 118 communicate via optical communication link 137, satellite 118 and satellite 114 communicate via optical communication link 136, satellite 120 and satellite 116 communicate via optical communication link 138, and satellite 120 establishes ground link 139 with Earth 105, and satellite 122 and satellite 112 communicate via optical communication link 134. It follows that the optical communication links are established between both adjacently positioned and non-adjacently positioned satellites (with respect to a corresponding transmitting satellite) and with regard to the satellites ordering within an orbit or constellation. Further, the direction of data flow may be bi-directional or unidirectional, and data can flow simultaneously (e.g., in a full-duplex mode), among combinations thereof. In another instance, once optical communication links are established, the satellites may track other satellites by automatically steering the line-of-sight of optical elements based on sensed pointing error, or via control circuitry of the optical elements. The line-of-sight of optical elements can be determined via gimbal angle telemetry.

As the satellites transit in orbit 111 (illustrated as counterclockwise motion in operating environments 101 and 102), the various angles associated with aiming or pointing of the optical links will change. The satellites obtain and monitor the indications of ephemeris to determine positions of other satellites and angular states (e.g., angular state 132) of corresponding optical communication links. At some point in orbit 111, at least one of the satellites determines that the angular state of a portion of optical communication links is reaching an exclusion range. In some instances, the exclusion range can be established with respect to solar radiation 130. This triggers the satellites to then establish a subsequent cross-connect configuration, as illustrated in operating environment 102, to avoid aiming optical elements within this exclusion range.

Operating environment 102 illustrates constellation 110 after a point where each satellite has shifted in orbit, namely counterclockwise by one exemplary slot in FIG. 1. Each satellite maintains orientation 131 to keep an associated, onboard solar array pointed in the direction of solar radiation 130. However, due to changes in satellite orbital positioning, some of the optical communication links (e.g., optical communication links 133-138) may be reaching the exclusion range or aiming too directly into solar radiation 130. This can cause unwanted signal interference or signal loss, so the satellites sever the optical communication links associated with the initial cross-connect configuration and establish subsequent optical communication links. In various instances, the satellites can be configured to automatically establish new communication links based on indications of ephemeris. For example, the satellites can reference a data structure, such as a configuration table, stored onboard a component of the satellites to determine instructions for the configuration of optical communication links associated with a cross-connect configuration. In another instance, the satellites can establish subsequent communication links after a known time duration and/or change in position. In yet another instance, instructions via a ground link (e.g., ground link 139) from Earth 105 can direct the satellites to establish subsequent communication links. Regardless of operation, the satellites can establish the optical communication links of the subsequent cross-connect configuration before breaking the optical communication links of the initial cross-connect configuration to avoid interrupting cross-connect communications or losing data. In the subsequent cross-connect configuration illustrated, satellite 112 and satellite 120 can continue to communicate via optical communication link 133, satellite 114 and satellite 116 communicate via optical communication link 145, satellite 116 and satellite 112 communicate via optical communication link 144, satellite 118 and satellite 114 can continue to communicate via optical communication link 136, and satellite 118 establishes ground link 149, satellite 120 and satellite 122 communicate via optical communication link 146, and satellite 122 and satellite 118 communicate via optical communication link 147.

Satellite constellation 110 can comprise additional or fewer satellites in other implementations that maintain cross-connect configurations for optical communications to avoid Sun-facing or obscured optical pointing while keeping solar arrays oriented to maximize solar irradiance. In FIG. 1, orbit 111 comprises a geostationary orbit or geosynchronous equatorial orbit (GEO). Other orbits and orbital configurations may be contemplated by the examples herein, such as other geosynchronous orbits (GSOs), low-earth orbit (LEO), medium-earth orbit (MEO), high-earth orbits, polar orbits, self-orbiting constellation arrangements without a central body, orbits about a Lagrange point, or orbits about any central body including planets, stars, asteroids, comets, moons, other satellites, or spacecraft. In various examples, the satellites of constellation 110 have associated orbits with the same orbit plane. However, the satellites may have different orbit planes intentionally or by normal perturbations. In either scenario, the spacing of the satellites may also not be uniform (e.g., 60 degrees apart). Furthermore, while considerations of solar radiation impingement are discussed herein, the cross-connect configurations can be employed with or without solar radiation concerns or associated solar panel orientations.

We turn now to a discussion on the elements of the satellites in FIG. 1, such as shown in detail for satellite 112. It should be understood that such elements can be applicable to any among satellites 112, 114, 116, 118, 120, and 122, although variations are possible.

Solar array 124 comprises one or more sets of photovoltaic cells configured to convert incident solar illumination to electrical power. This electrical power can be provided to various on-board systems of the satellite, such as the elements described below as well as various payload elements, scientific instruments, communication and ranging elements, monitoring and control elements, as well as various propulsion, guidance, orientation, station-keeping, reaction control, attitude adjustment, and orbital adjustment elements. The composition of the photovoltaic cells might vary based on application, but can include semiconductor-based cells, among others. The satellites may also include various structural or support elements, power conversion circuitry, power electronics, power controllers, orientation control elements, thermal control elements, and other various support circuitry and structures. Furthermore, the satellites can include various other power system elements that include components that provide electrical power. The electrical power might be derived from on-board generation systems, batteries, or radioisotope thermoelectric generators (RTG), thermoelectric generators (TEG), among other power generation systems. Further elements can be included to provide propulsion, orientation, and navigation elements that can comprise various equipment to move or orient the satellite.

Optical communication elements 125 optics and the optical pathway of a laser communications system, which may include laser communication terminals (LCTs). Optical communication elements 125 includes various optical media interface elements to emit and receive photonic signals over free space, as well as maintain optical links or optical pointing configurations. Optical communication elements 125 can receive control instructions from on-board controllers to alter configurations of optics or mirrors that affect an optical link, such as controlling deformable mirrors or optics, servo control, tilt/tip mirrors, pointing/aiming/gimbal, or other optic configuration parameters. In some examples, bulk movement of a satellite can be provided by a satellite-wide logistical system (i.e. movement or orientation) and fine grain movement provided by optics of optical communication elements 125. Optical communication elements 125 might inform a logistical system to perform bulk movements, such as firing of thrusters, deploying mass shifting techniques, engaging flywheel or gyroscopic elements, momentum wheels, or other similar elements.

Logistical elements can move, orient, or point the satellite device, move into different orbital configurations, adjust relative distances among satellite devices, or perform station-keeping, reaction control, orientation, or attitude adjustments. Logistical elements can encompass bulk movement or propulsion systems, as well as reaction control systems (RCS). The logistical elements can receive guidance telemetry from external sensors or external sources, such as accelerometers, positioning sensors, gyroscopic sensors, and the like. The logistical elements can provide propulsion or guidance command and control to physical systems which alter positioning or orientation. Various engines, thrusters, inertial control and manipulation elements, or other elements capable of making adjustments to position, orientation, orbit, speed, or other movement parameters can be included. The logistical elements can also comprise distance sensing equipment or navigation equipment to determine relative distances from Earth or from other satellite devices. This distance sensing equipment or navigation equipment can comprise laser ranging equipment, radar equipment, or signal strength sensing equipment. Further examples can employ systems to determine geographic coordinates using one or more global positioning systems (GPS, GLONASS, Galileo), star-tracking systems, visual tracking systems, accelerometer-based tracking systems, or dead-reckoning systems, among others.

Satellite bus 126 comprises a chassis or structure with underlying power distribution elements, logistical elements, and thermal control elements. Satellite bus 126 might form the main body of the satellite, with various components attached thereto. Satellite bus 126 can include various launch and deployment features, such as for deploying from a launch vehicle to reach a desired orbital configuration. Satellite bus 126 also may include thermal radiators which can dump heat into space according to on-board thermal control needs. Also, the logistical elements mentioned above might be included in satellite bus 126 or attached thereto to provide changes to orientation, attitude, trajectory, orbit, or other movement.

Figure 2:
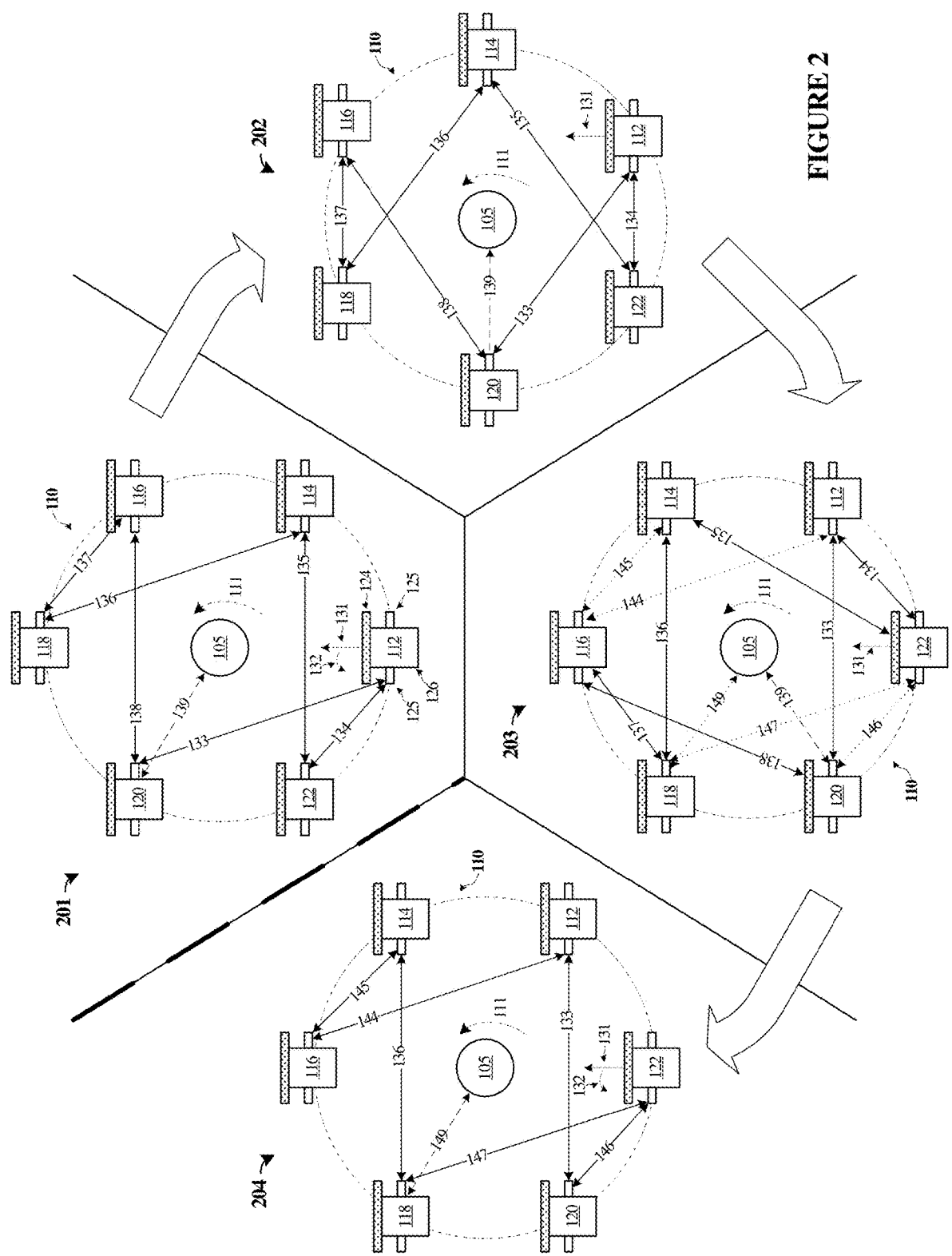
FIG. 2 illustrates example operating environments demonstrating optical communication links among satellites during transitions between cross-connect configurations in an implementation.

To further illustrate the changes among cross-connect states discussed above, FIG. 2 is presented. FIG. 2 includes operating phases 201, 202, 203, and 204 that illustrate stages of optical communications among a constellation of satellites while in cross-connection and during transitional stages between cross-connect configurations. Solar irradiance is not shown in FIG. 2, but is nonetheless intended to be incident on the solar arrays of the satellites. On orbit, a constellation of satellites will progress through configurations represented by each of operating phases 201, 202, 203, and 204 in a sequential manner. While further operating phases are encountered on orbit by the constellation after phase 204, four exemplary phases are shown to illustrate various cross-connect configurations. Also, during each of the operating phases, orientations of the satellites are maintained so as to maintain solar incidence onto the corresponding solar arrays. Aiming or pointing of optical transmitters/receivers also change to maintain connections with the selected satellites.

Operating phase 201 demonstrates an initial cross-connect configuration among constellation 110 including satellites 112, 114, 116, 118, 120, and 122 that communicate with each other via optical communication links while in orbit 111 around Earth 105 or any suitable orbited body. Operating phase 202 demonstrates an initial transitional stage wherein the satellites have progressed through a portion of orbit 111. Operating phase 203 demonstrates a subsequent transitional stage wherein the satellites have progressed further in orbit 111 and begin to establish subsequent optical communication links. Operating phase 204 demonstrates a subsequent cross-connect configuration wherein the satellites have severed the initial optical communication links and communicate via the subsequent optical communication links.

Operating phase 201 illustrates the satellites of constellation 110 in an initial cross-connect configuration, such as the initial cross-connect configuration of operating phase 101 of FIG. 1. In orbit 111, the satellites maintain orientation 131 with respect to solar incidence such that onboard solar arrays remain generally perpendicular to the solar incidence. Due to a size of the onboard solar arrays, the satellites may be limited in communication range and may be configured to optically communicate within an allowable angular range. Each satellite of constellation 110 can obtain indications of ephemeris to determine information, such as the allowable angular range, among other indications. The indications of ephemeris allow the satellite to determine a current position and a projected position of each satellite within orbit 111, among other information. For example, the indications of ephemeris can allow satellite 112 to determine that satellites 114 and 122 are neighboring, adjacent satellites, and/or that satellites 116, 118, and 120 are non-adjacently positioned satellites with respect to satellite 112. Further, the indications allow each satellite to determine pointing angles (with respect to orientation 131) for optical elements onboard the satellites to establish optical communication links with other satellites. In other words, satellite 112, for example, can determine that it can communicate to satellite 120 via optical communication link 133 at angular state 132, which may denote a pointing angle, with respect to orientation 131, of an optical element onboard satellite 112.

Prior to establishing the initial cross-connect configuration, the satellites may employ on-board tables or data structures which relate the ephemeris, or indications thereof, to desired cross-connect configurations that indicate which satellite devices are to be cross-connected. The satellites may employ various algorithms to dynamically compute aiming or pointing angles based on which satellites are to be cross-connected, and to maintain the cross-connect configuration as the satellites all transit through orbit 111. In this initial cross-connect configuration, satellite 112 and satellite 120 communicate via optical communication link 133, satellite 114 and satellite 122 communicate via optical communication link 135, satellite 116 and satellite 118 communicate via optical communication link 137, satellite 118 and satellite 114 communicate via optical communication link 136, satellite 120 and satellite 116 communicate via optical communication link 138, satellite 120 establishes ground link 139 with Earth 105, and satellite 122 and satellite 112 communicate via optical communication link 134. The optical communication links are established between both adjacently positioned and non-adjacently positioned satellites (with respect to a corresponding transmitting satellite) and with regard to the satellites ordering within an orbit or constellation at angular states outside an exclusion range (i.e., an angular range that may cause interference with the optical communication links).

In operating phase 202, the satellites of constellation 110 enter an initial transitional stage wherein the satellites have shifted in orbit, namely counterclockwise by one-half exemplary slot (e.g., approximately 30 degrees) while maintaining orientation 131. This shift causes various angles associated with aiming or pointing of optical elements to change. Each satellite of constellation 110 monitors the indications of ephemeris to determine positions of other satellites within orbit 111 and angular states of respective optical communication links. Because none of the satellites have determined that optical communication links are pointed with an angular state that breaches the exclusion range, the satellites maintain the optical communication links established in the initial cross-connect configuration of operating phase 201.

In operating phase 203, the satellites have transited further to where each satellite has shifted in orbit 111 one exemplary slot counterclockwise (e.g., approximately 30 degrees). At this point, at least one of the satellites determines that the changes in satellite positioning have caused some of optical communication links to be pointed at angles close to the boundary of the exclusion range. For example, satellite 122 may determine that the angular state of optical communication link 135 established with satellite 114 (with respect to orientation 131) would penetrate the exclusion range with further orbital motion. Accordingly, satellite 122, or another satellite, may initiate a reconfiguration of the cross-connect configuration. In various examples, the satellites can use the onboard configuration table or data structures that indicate which communication links to break and/or create based on the indications of ephemeris, among other indicators. In other examples, instructions may be communicated to the satellites from a remote terminal via ground link 139. In either case, each of the satellites establishes subsequent optical communication links while transitioning from the initial cross-connect configuration to a subsequent cross-connect configuration. In operating phase 203, the subsequent optical communication links (optical communication links 144-147) are indicated as dotted lines as the optical communication links associated with the initial cross-connect configuration may still be primarily used until indication of successful connection between the satellites via the subsequent optical communication links.

In operating phase 204, the satellites of constellation 110 sever the optical communication links corresponding to the initial cross-connect configuration creating a subsequent cross-connect configuration with the subsequent optical communication links. In the subsequent cross-connect configuration, the satellites maintain orientation 131 to keep the solar arrays onboard each satellite pointed in the direction of solar radiation while maintaining optical communication links outside the exclusion range. Accordingly, satellite 112 and satellite 120 can continue to communicate via optical communication link 133, satellite 114 and satellite 116 communicate via optical communication link 145, satellite 116 and satellite 112 communicate via optical communication link 144, satellite 118 and satellite 114 can continue to communicate via optical communication link 136 and satellite 118 establishes ground link 149, satellite 120 and satellite 122 communicate via optical communication link 146, and satellite 122 and satellite 118 communicate via optical communication 147. While the subsequent optical communication links may comprise some of the same optical connections established within the initial cross-connect configuration (optical communication links 133 and 136), the portion(s) of the initial optical communication links that are about to penetrate the exclusion range are replaced such that optical communication links of operating phase 204 avoid the exclusion range. As the satellites continue transiting in orbit 111, they can continue to monitor indications of ephemeris and angular states of optical elements to reconfigure communication links as necessary.

Figure 3B:
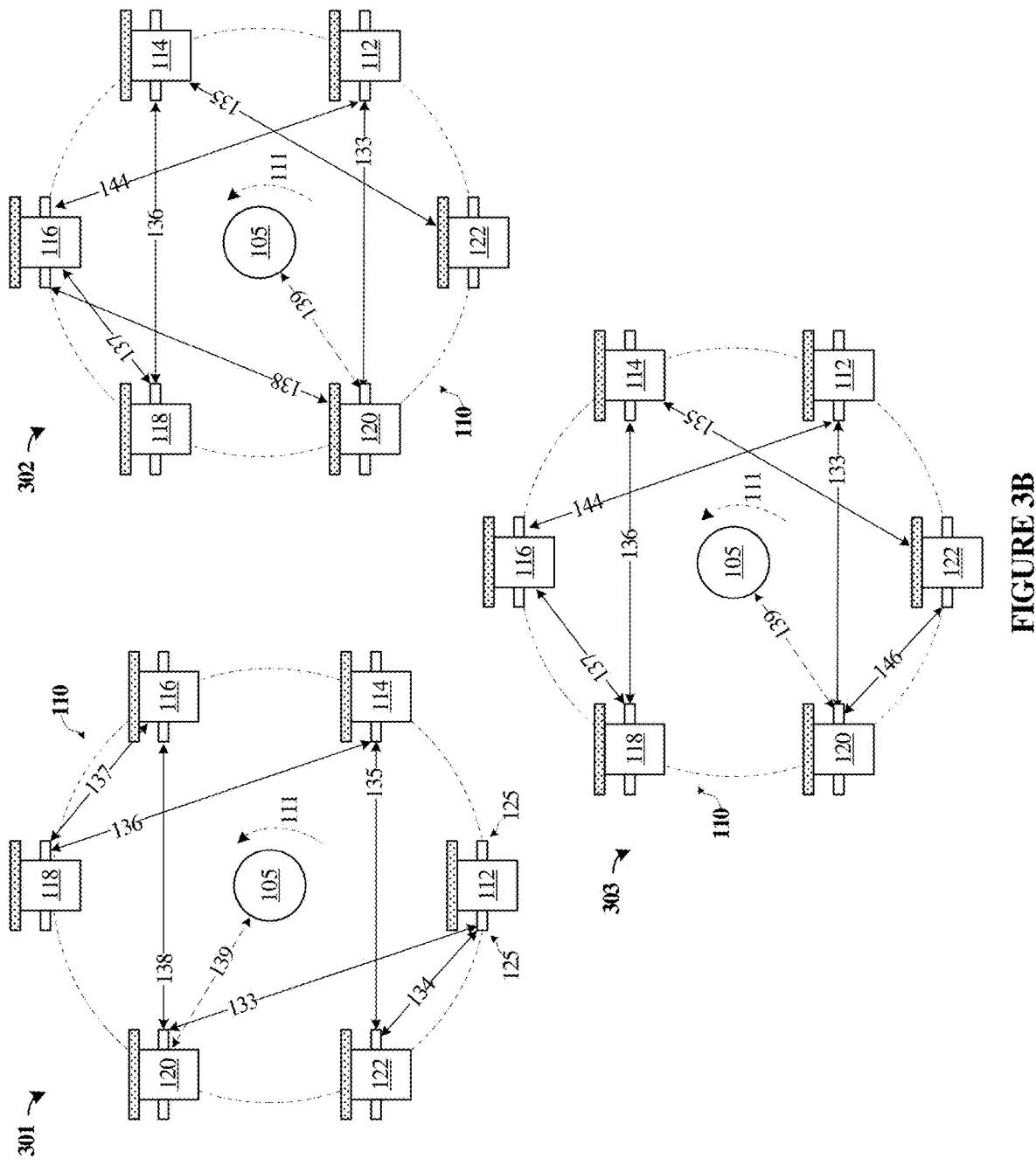
Figure 3C:
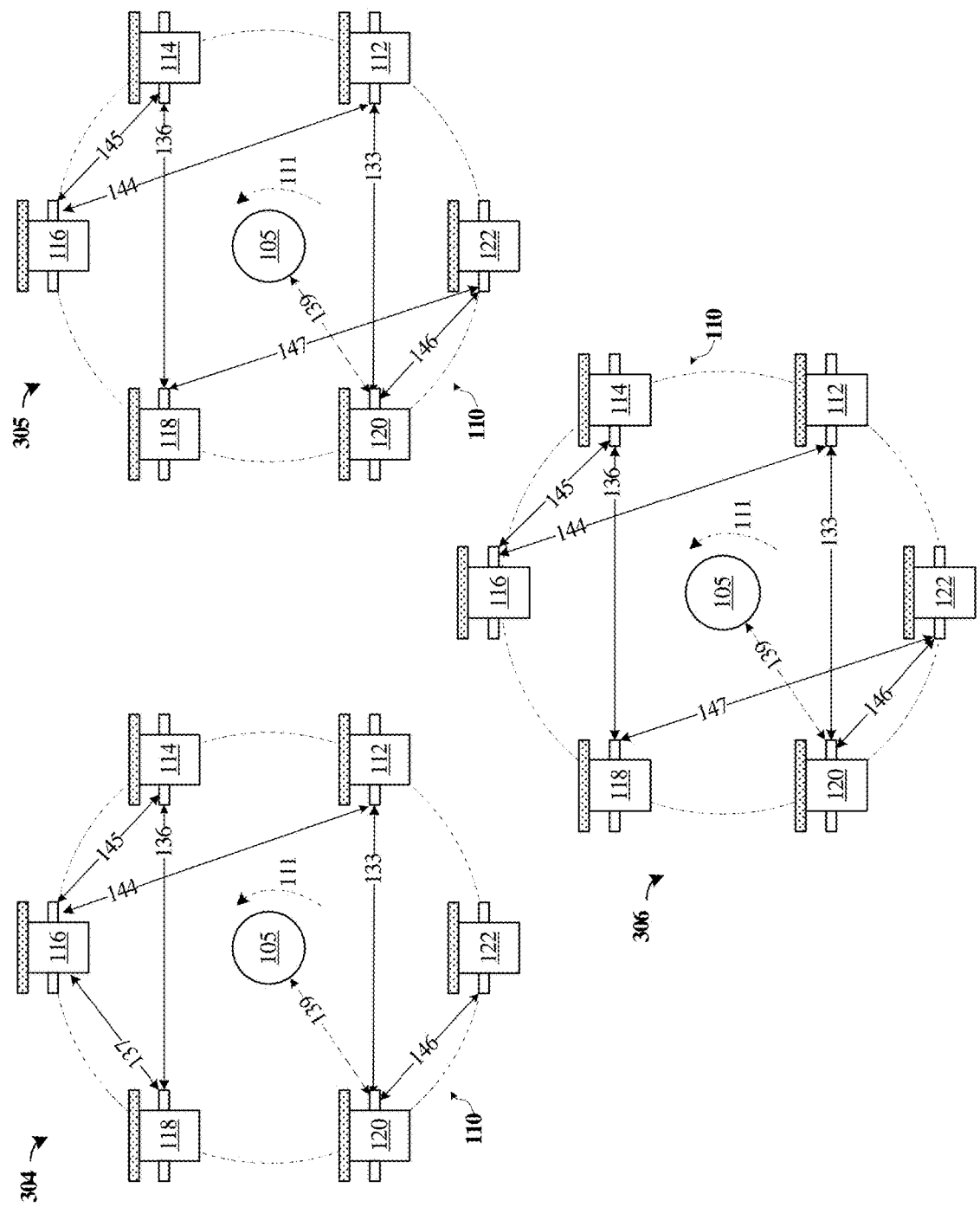

FIGS. 3A, 3B, and 3C illustrate an example set of steps, which may be represented in a data structure for configuring and reconfiguring optical communication links during transitions between cross-connect configurations. FIG. 3A includes configuration table 300 that details connection schemes associated with each satellite in a constellation. Configuration table 300 includes an initial cross-connect configuration to be established by the satellites, configuration 301, such as the initial cross-connect configuration of operating environment 101 of FIG. 1, reconfiguration steps 302, 303, 304, and 305, and a subsequent cross-connect configuration to be established following position changes of the satellites during orbit, configuration 306, such as the subsequent cross-connect configuration of operating environment 102 of FIG. 1. FIGS. 3B and 3C provide illustrative examples of the optical communication links established by the constellation of satellites at each of the reconfiguration steps. The operations included in configuration table 300 are discussed below and reference elements of FIG. 1.

To begin, satellites 112, 114, 116, 118, 120, and 122 of constellation 110 are configured to establish an initial cross-connect configuration for optical communications in orbit 111. In one instance, the satellites employ on-board tables or data structures, such as configuration table 300, which relate indications of ephemeris obtained by each satellite to desired cross-connect configurations that indicate which satellite devices are to be cross-connected. The satellites employ various algorithms to dynamically compute aiming or pointing angles based on which satellites are to be cross-connected, and to maintain the cross-connect configuration as the satellites all transit through orbit 111. In another instance, each satellite can autonomously determine, via algorithms, which satellite to establish optical communication links with based on indications of ephemeris associated with each satellite that may indicate positioning of the other satellites within the orbit with respect to an Earth-centered inertial coordinate frame, for example. In such instances, the satellites may determine when and/or where to establish new optical communication links and break existing optical communication links. Regardless, the initial cross-connect configuration established by the satellites allows for optical communication links to be established outside an exclusion range.

While in configuration 301, satellite 112 communicates with satellite 120 via optical communication link 133 and communicates with satellite 122 via optical communication link 134. Satellite 114 communicates with satellite 122 via optical communication link 135 and communicates with satellite 118 via optical communication link 136. Satellite 116 communicates with satellite 118 via optical communication link 137 and communicates with satellite 120 via optical communication link 138. During each following reconfiguration step, each satellite may maintain optical connectivity between other corresponding satellites while transiting in orbit 111. Each of the satellites can connect/disconnect from other satellites according to configuration table 300 and/or change directions of optical communication links with another satellite to avoid pointing optical elements and communicating in the exclusion range.

First, in reconfiguration step 302, the satellites have transited in orbit and at least one of the satellites begins to establish a subsequent optical communication link according to the subsequent cross-connect configuration of configuration 306. For instance, the satellite may determine that a portion of an existing optical communication link is reaching an exclusion range. Specifically, and as illustrated in FIG. 3B, satellite 116 establishes optical communication link 144 with satellite 112. Satellite 116 can maintain optical communication link 137 with satellite 118 until a later point. Satellite 122 then breaks optical communication link 134 with satellite 112 because satellite 116 has begun to communicate with satellite 112 instead.

Next, in reconfiguration step 303 and as illustrated in FIG. 3B, satellite 120 breaks optical communication link 138 with satellite 116, and it establishes optical communication link 146 with satellite 122. Satellite 122 may optically communicate with both satellite 114 and 120 at this point in the transition to the subsequent cross-connect configuration.

Referring still to configuration table 300, but also now referring to FIG. 3C, in reconfiguration step 304, satellite 114 establishes optical communication link 145 with satellite 116 and breaks optical communication link 135 with satellite 122 at some later point. At this step, satellite 122 may only communicate with satellite 120 via optical communication link 146.

In reconfiguration step 305 and as illustrated in FIG. 3C, satellite 116 can break optical communication link 137 to satellite 118 allowing satellite 116 to communicate with satellite 112 via optical communication link 144. Satellites 118 and 122 can establish optical communication link 147. As a result of now communicating with satellite 122 via optical communication link 147, satellite 118 can break optical communication link 137 with satellite 116.

Following all the reconfiguration steps, the satellites of constellation 110 establish the subsequent cross-connect configuration of configuration 306 wherein the satellites optically communicate with a corresponding pair of satellites according to configuration table 300. Each satellite, in both configurations 301 and 306 and further subsequent cross-connect configurations, can establish optical communication links with an adjacently positioned and non-adjacently positioned satellite (with respect to a corresponding transmitting satellite) and with regard to the satellites ordering within orbit 111 among constellation 110. Each satellite may also reconfigure corresponding optical communication links in different orders or at different times/positions while transiting orbit 111. While not demonstrated, other ground links with Earth 105 may also be established during transit in orbit 111 as determined by the satellites or by instructions.

Figure 4:
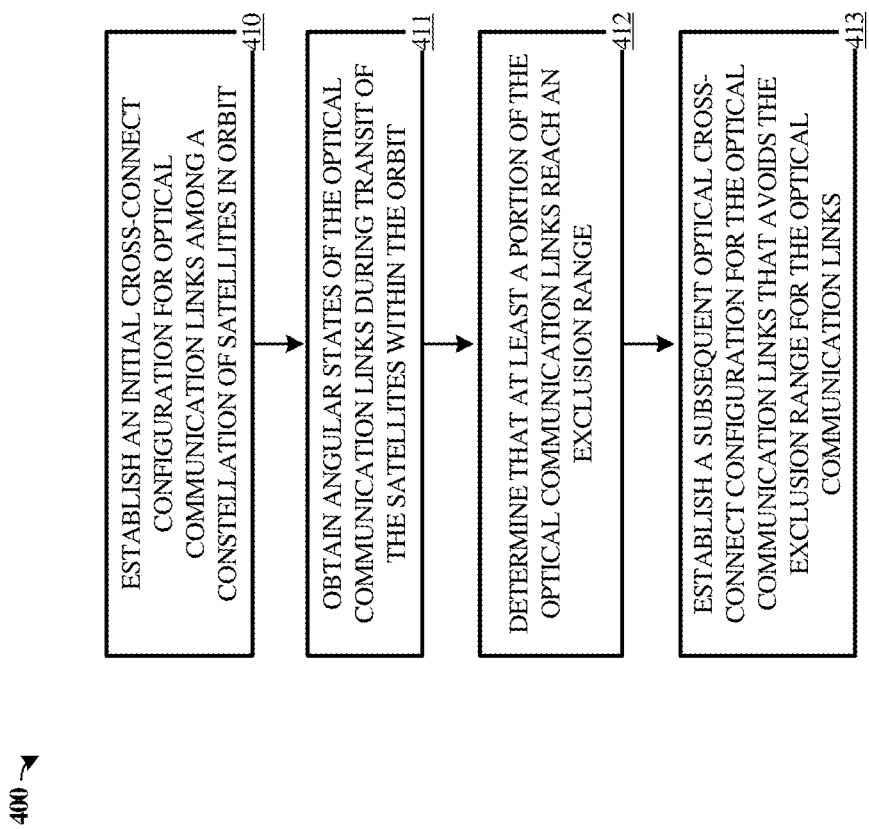
FIG. 4 illustrates an example method of establishing optical communication links among satellites in a cross-connect configuration in an implementation.

FIG. 4 illustrates a method of establishing optical communication links among satellites in a cross-connect configuration, such as the initial cross-connect configuration between the satellites of constellation 110 of FIG. 1. FIG. 4 includes operations 400 noted parenthetically in the discussion below and which reference elements of FIG. 1.

In operation 410, satellites 112, 114, 116, 118, 120, and 122 establish (410) an initial cross-connect configuration for optical communication links among a constellation 110 of satellites in orbit 111. To establish the initial cross-connect configuration, each of the satellites can obtain and use indications of ephemeris to determine a current position and a projected position of each satellite within orbit 111. For example, the indications of ephemeris can allow satellite 112 to determine that satellites 114 and 122 are neighboring, adjacent satellites, that satellites 116, 118, and 120 are non-adjacently positioned satellites, and which angles, with respect to a given orientation 131, it can point optical elements to establish optical communication links with other satellites among constellation 110. Based on the indications of ephemeris, the satellites, either autonomously or via various algorithms employing onboard instructions or data structures or transmitted/commanded instructions, establish optical communication links (e.g., optical communication links 133-138) to form the initial cross-connect configuration.

In operation 411, the satellites obtain (411) angular states 132 of the optical communication links during transit of the satellites within the orbit 111. Each satellite can determine various angles, or angular states, associated with aiming or pointing of onboard optical elements by using the indications of ephemeris to determine information, such as relative positions of the other satellites within orbit 111 For instance, satellite 112 can determine angular state 132 of optical communication link 133, which may denote a pointing angle of an optical element with respect to orientation 131, based on where the satellite 120 is located with respect to satellite 112. The satellites may constantly or periodically monitor angular states as they transit through orbit 111.

In operation 412, at least one of the satellites determines (412) that at least a portion of the optical communication links reach an exclusion range. In various instances, the exclusion range comprises a range of approximately 20-50 degrees offset from a direction of solar radiation 130. So, as the satellites monitor angular states of the optical communication links, one satellite may determine that part of the optical communication links that it has established with another satellite approaches or breaches this exclusion range. An example consequence of operating optical communication links in the exclusion range is loss of signal due to line-of-sight obscuration or solar interference.

Lastly, in operation 413, the satellites of constellation 110 establish (413) a subsequent optical cross-connect configuration that avoids aiming optical elements within the exclusion range. While the satellites can maintain optical connectivity during transitions from the initial optical cross-connect configuration to the subsequent optical cross-connect configuration, after establishing these subsequent optical communication links (e.g., optical communication links 144-147), the satellites may break the optical communication links associated with the initial cross-connect configuration. In several instances, the satellites can utilize a configuration table (e.g., configuration table 300 of FIG. 3) stored onboard components of each satellite to determine which communication links to create and break during orbit 111. The satellites may employ algorithms to dynamically compute aiming or pointing angle based on which satellites are to be cross-connected according to the configuration table. In other instances, the satellites may determine an order of creating/breaking communication links without a pre-configured table or data structure based on the indications of ephemeris and the angular states of the optical communication links.

Figure 5:
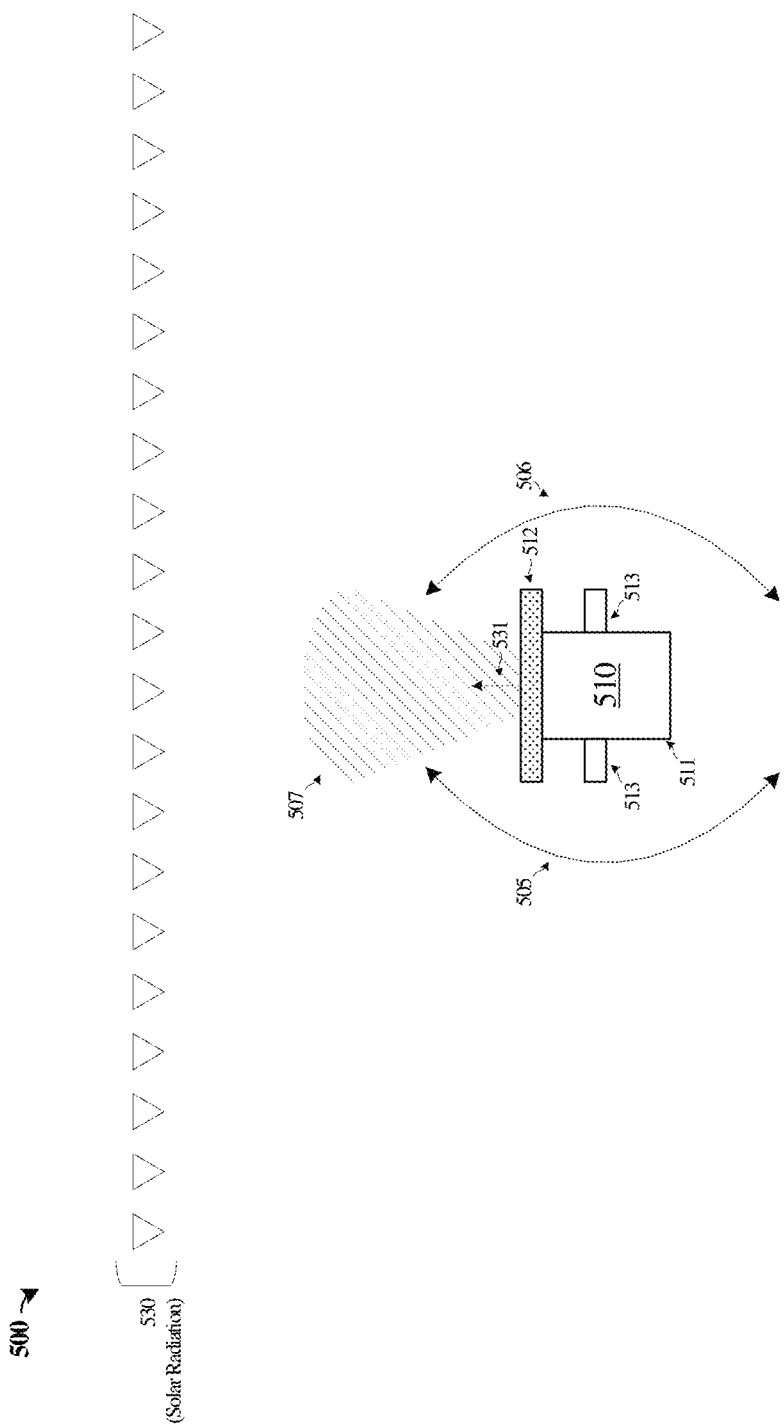
FIG. 5 illustrates an example aspect of optical communication capabilities of a satellite in an implementation.

FIG. 5 illustrates an example aspect of optical communication capabilities of a satellite. FIG. 5 includes operational environment 500, which further includes satellite 510 and solar radiation 530. Satellite 510 is representative of any satellite discussed herein, such as satellites 112, 114, 116, 118, 120, and 122 of FIGS. 1 and 2. Satellite 510 comprises bus 511, solar array 512, and optical communication elements 513. Satellite 510 maintains orientation 531 with respect to solar radiation 530.

In operation, satellite 510 is one satellite among a constellation of satellites in orbit around Earth or any suitable orbited body. Satellite 510 is configured to perform various functions, such as capture solar radiation energy via solar array 512, establish optical communications using optical communication elements 513 with other satellites of the constellation via cross-connect configurations, and transmit/receive communications with a ground station or terminal on Earth. To establish optical communications, satellite 510 comprises optical communication elements 513 (e.g., laser communication terminals (LCTs)) that can be pointed and continually aimed towards other selected satellites within the constellation to establish optical communication links.

In various instances, optical communication elements 513 may be configured to operate within a limited range of communication, depicted by ranges 505 and 506. Ranges 505 and 506 comprise two fields of view of approximately 150 degrees with respect to orientation 131, allowing satellite 510 to communicate with adjacently and non-adjacently positioned satellites (with respect to satellite 510) within ranges 505 and 506. The remaining, obstructed field of view of the optical elements, exclusion range 507, may comprise approximately 60 degrees in the direction of orientation 531, or 30 degrees offset from a direction of solar radiation 130 with respect to orientation 531. When solar array 512 is sized above a certain area, the solar panels can physically occlude or block the aiming of satellite optical communication elements for certain orientations, such as orientation 531. However, because solar radiation 530 can cause interference with the optical communications transmitted/received by the optical elements, satellite 510 may nonetheless be configured to transmit/receive only within ranges 505 and 506. This configuration may also supply at least one among several benefits for satellite 510. First, by avoiding communication within exclusion range 507, satellite 510 can be equipped with larger solar panels making up solar array 512 while still having the ability to optically communicate in other directions. Secondly, it may allow satellite 510 to maintain a perpendicular incident arrangement (denoted by orientation 531) in the direction of solar radiation 530 throughout changes in orbital positioning to increase solar energy capture by solar array 512.

Figure 6:
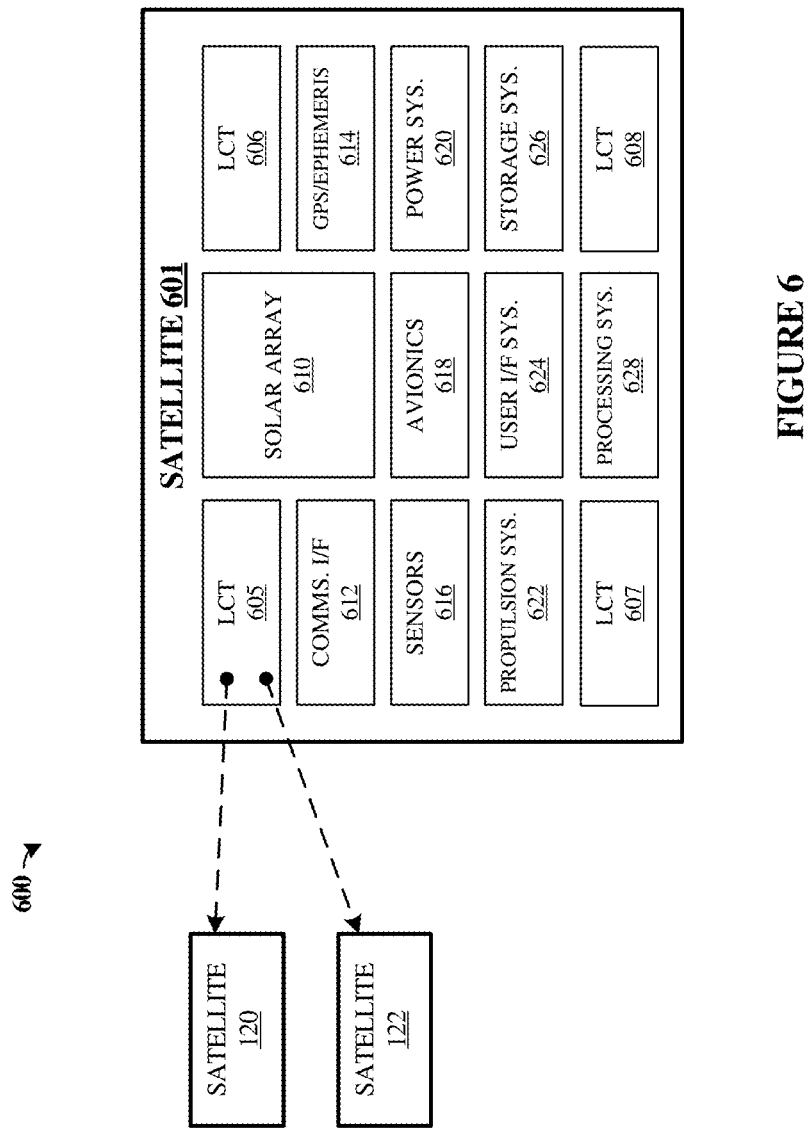
FIG. 6 illustrates a block diagram including components that may be used in a satellite to optically communicate in a cross-connect configuration in an implementation.

FIG. 6 illustrates block diagram 600 including components of satellite 601 to optically communicate in a cross-connect configuration, such as in initial cross-connect configuration of operating environment 101 of FIG. 1, among others. Satellite 601 demonstrates exemplary components of any of the satellites discussed herein, which may be incorporated in various operating environments and phases discussed in the preceding Figures. For example, satellite 601 may comprise elements from satellites 112, 114, 116, 118, 120, 122 of constellation 110 of FIG. 1, or elements from satellite 510 of FIG. 5.

Turning to block diagram 600, satellite 601 includes LCTs 605, 606, 607, and 608, solar array 610, communications interface 612, GPS/ephemeris 614, sensors 616, satellite avionics 618, power system 620, propulsion system 622, user interface system 624, storage system 626, and processing system 628. Using the exemplary onboard components, satellite 601 can be configured to capture solar radiation energy, establish optical communications with other satellites among a constellation having a shared orbit, and transmit/receive communications with a ground station or terminal on Earth.

To establish optical communications, satellite 601 comprises LCTs 605, 606, 607, and 608 that make up a laser communication system onboard satellite 601 and are directed by communications interface 612 to establish optical communication links with other satellites. Each of the LCTs may comprise optical elements that point, target, and tune the optical communication links. The LCTs may operate within an angular range such that the optical communication links do not breach an angular exclusion range wherein solar radiation may interfere with the signals. In some cases, the angular exclusion range comprises a range of approximately 20 to 50 degrees offset from a direction of solar radiation.

To determine if the optical elements of the LCTs are operating within the angular exclusion range, GPS/ephemeris 614 can provide indications of ephemeris associated with both satellite 601, other satellites in the constellation, and the Sun. GPS/ephemeris 614 can provide positional information such as current/relative position and project position of the satellites. The ephemeris data of one satellite can be provided to other satellites via the LCT communication links. GPS/ephemeris 614 may communicate with sensors 616, satellite avionics 618, and propulsion system 622, among other components, to track position, velocity, and the like. Based on the indications of ephemeris provided by GPS/ephemeris 614, satellite 601 can adjust position/orientation, reconfigure optical communication links, or the like to ensure desired mission goals are met. Alternatively, orbit and position determination may be performed by a ground/remote terminal based on RF ranging or LCT range data, for example. Such data can be distributed to one or more of the satellites via a ground link.

Sensors 616 may comprise star trackers, optical sensors, radiation sensors, and other sensors configured to supply satellite 601 with satellite inertial attitude information (i.e., orientation of the spacecraft body frame or bus structure relative to an inertial frame) during orbit. For example, sensors 616 may detect a shift in orientation and determine that solar array 610 is not maintaining a generally perpendicular arrangement in the direction of solar radiation. Accordingly, processing system 628 can direct other components of satellite 601 to correct the orientation. By way of another example, sensors 616 may detect that an optical communication link being received/transmitted by one of the LCTs is reaching the threshold or exclusionary angular state. In yet another example, satellite 601 can determine inertial LCT line-of-sight vectors based on an alignment and orientation of the LCTs and LCT mounting interfaces and line-of-sight gimbal angles. Sensors 616 can notify processing system 628 and/or communications interface 612 to adjust the LCTs or direct the LCTs to target and point at different satellites according to a subsequent cross-connect configuration.

Satellite avionics 618, power system 620, and propulsion system 622 function to control flight and motion of satellite 601. Satellite avionics 618 can comprise various electronic elements onboard satellite 601, power system 620 can comprise batteries, generators, or other power sources to power satellite 612, and propulsion system 622 can comprise engines, thrusters, inertial control and manipulation elements, or other elements capable of making adjustments to position, orientation, orbit, speed, or other movement parameters in and through the orbit. In various examples, power system 620 may be fed by solar array 610 to generate energy for powering satellite 601.

User interface system 624 can comprise various hardware, software, or any combination thereof to allow user control of satellite 601. In an instance, user interface 624 allows a user (e.g., ground terminal) to control functions of satellite 601 remotely via a ground link established between the user and satellite 601. The user may specify operations of the LCTs via user interface 624 and communications interface 612 for satellite 601 to transition from an initial cross-connect configuration to a subsequent cross-connect configuration. In other instances, the user may upload a configuration table or data structures which relate the ephemeris to desired cross-connect configurations indicating a satellite that satellite 601 can connect to.

Storage system 626 may include one or more computer-readable storage media configured to store radiation collections data, flight and operations data, ephemeris indications, optical communications links and configurations, and the like. In various implementations, storage system 626 may comprise a configuration table (e.g., configuration table 300 of FIG. 3) or data structure specifying targets of optical communication links and timing for transmissions of the optical communication links. Specifically, processing system 628 can execute portions of the configuration table allowing satellite 601 to establish optical communication links via LCT 605 with satellites 120 and 122. At later points, processing system 628 can execute other portions of the configuration table directing satellite 601 to establish one or more subsequent optical communication links and/or break one or more of former optical communication links already established.

Figure 7:
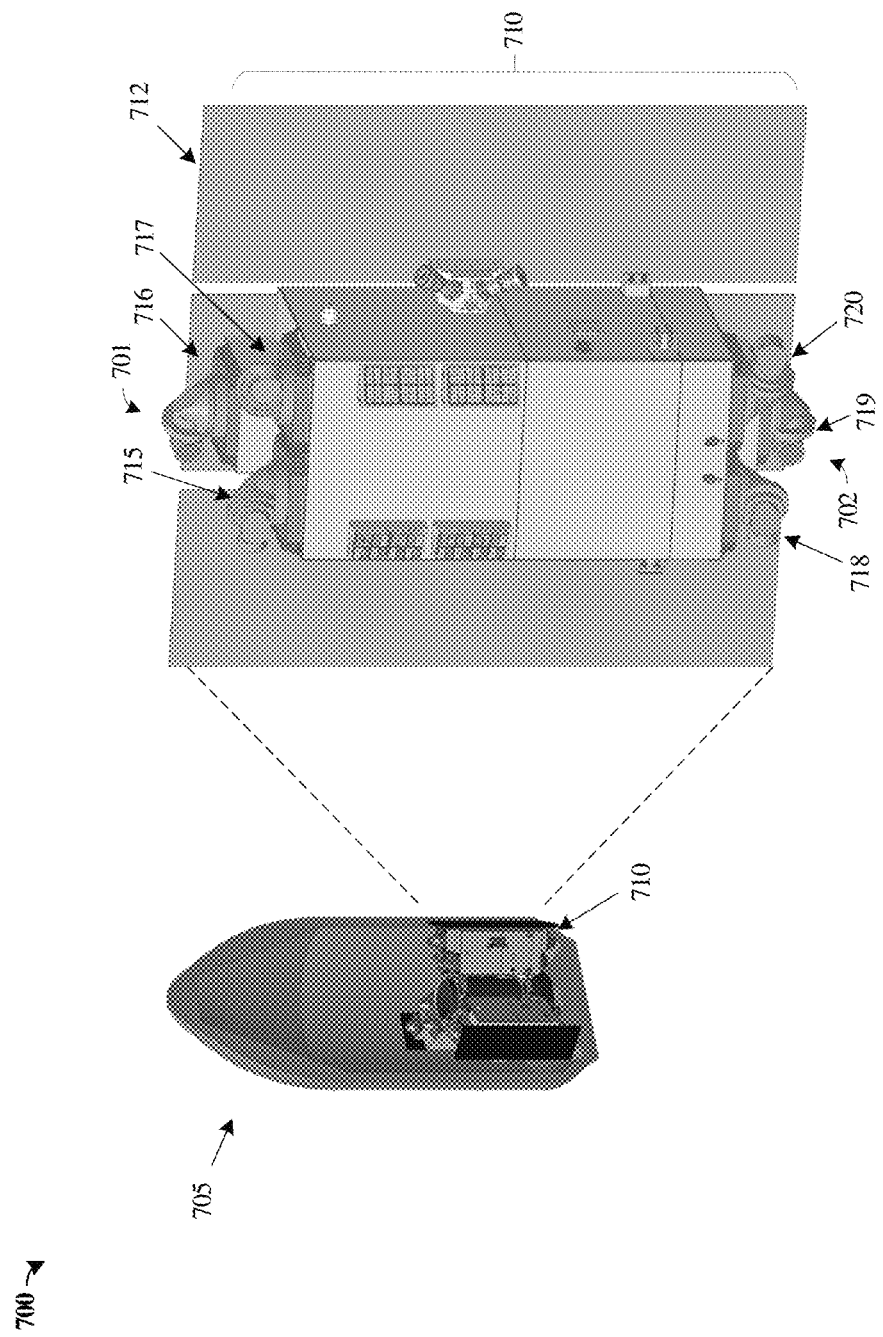
FIG. 7 illustrates example aspects of a satellite and a payload used in an implementation.

FIG. 7 illustrates operating environment 700, which demonstrates example aspects and components of satellite 710 and payload fairing 705 that may house one or more satellites. In operating environment 700, satellite 710 includes solar array 712 and optical elements 715-720. Although FIG. 7 illustrates one specific implementation of satellites and associated elements, the techniques and operations discussed herein can be applied to satellites having different physical configurations and different launch configurations.

Satellite 710 may be configured to transit in an associated orbit with other satellites carried within payload fairing 705 (i.e., a single launch vehicle) or other satellites deployed at other instances. Satellite 710 comprises a solar array 712 made up of one or more solar panels configured to capture and convert solar radiation from the Sun into electrical energy. Solar array 712 can be mechanically coupled to an outer portion of satellite 710. Solar array 712 can also be electrically coupled to components of satellite 710 allowing the converted solar energy to be distributed or stored onboard satellite 710.

While deployed in orbit, satellite 710 maintains an orientation with respect to solar radiation such that the onboard solar array 712 is generally perpendicular to incident solar radiation and points at the Sun or at sun/solar vector projections in the orbit plane. Pointing of satellite 710 (and consequently solar array 712) can make use of solar ephemeris, which provides the sun/solar vector in an inertial frame. A target frame for satellite pointing control may be established based on the sun/solar vector and transformed into an orbit frame. For example, the satellite orbit frame may be defined by the orbit normal, Nadir vector (i.e., vector directed from the satellite to the center of the Earth), and the velocity vector for a circular orbit. The body frame or bus structure of satellite 710 can be established in orientation such that one axis may be parallel or coincident with a solar array normal vector. Such an orientation allows solar array 712 to maximize capture of solar energy. However, when solar array 712 is sized above a certain area, the solar panels can physically occlude or block the aiming of satellite optical communication elements (optical elements 715-720) for certain orientations. In some systems, satellite 710 might be turned or oriented so as to not have solar array 712 perpendicular to incident solar radiation, however, this reduces the usable energy for satellite 710. In the examples herein, a perpendicular incident arrangement is maintained throughout the orbital transit.

Satellite 710 also comprises six optical elements, namely optical elements 715-720 (hereinafter referred to as "optical elements"), affixed to outer portions of satellite 710. In an instance, three of the optical elements may be placed on a first longitudinal end 701 of satellite 710 and three may be placed on a second longitudinal end 702 of satellite 710. As discussed herein, the optical elements may be pointed in a selected direction, or may rotate about mechanically, electro-mechanically, electro-optically, or otherwise, to target, establish, and maintain optical communication links with other satellites in the orbit.

The optical elements can be configured to operate within an angular range. As discussed herein, this range is selected to avoid obscuration of the optical elements by solar panels and/or pointing optical communication links too closely into the direction of solar radiation, which may cause interruption and interference, among other issues. As satellite 710 transits in orbit, the optical elements can be directed to target specific satellites in the orbit with optical communication links according to desired cross-connect configurations. If satellite 710 determines that an angular state of at least one of the optical elements reaches a designated exclusion range, satellite 710 can direct at least some of the optical elements to establish optical communication links with different satellites in the orbit to avoid issues caused by obscuration and solar radiation.

In other examples, satellite 710, and other satellites discussed herein, can comprise additional or fewer optical elements, solar arrays, and/or other components. For instance, although six optical elements are shown per-satellite in FIG. 7, it should be understood that a different quantity can be employed. Additionally, the placement and/or orientation of such elements and mounting interfaces for the elements can also vary based on desired operating characteristics of a satellite/system.

Figure 8:
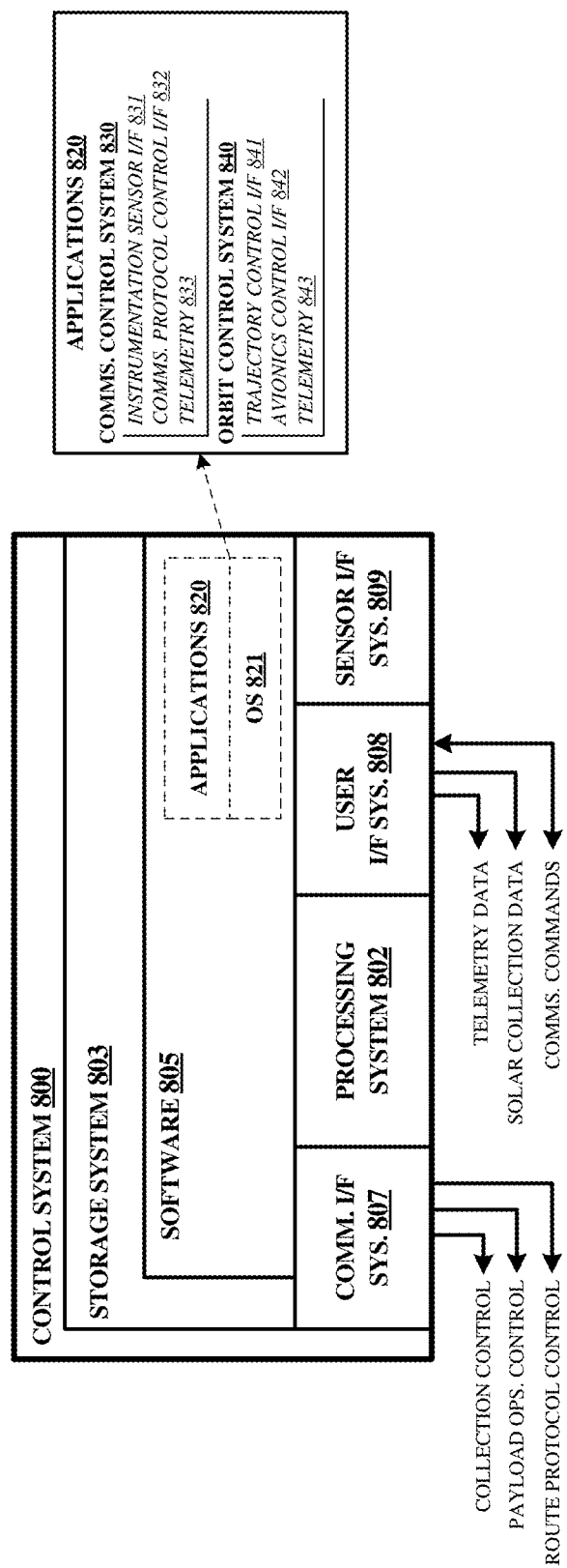
FIG. 8 illustrates a control system in an implementation.

FIG. 8 illustrates control system 800 and associated software 805 in an implementation. FIG. 8 illustrates control system 800 that is representative of any system or collection of systems in which the various operational architectures, scenarios, and processes disclosed herein may be implemented. For example, control system 800 can be used to implement and operate elements of satellites 112, 114, 116, 118, 120, 122 of constellation 110 of FIG. 1, such as the elements and components of satellite 601 of FIG. 6.

Control system 800 may be implemented as a single apparatus, system, or device or may be implemented in a distributed manner as multiple apparatuses, systems, or devices. Control system 800 includes, but is not limited to, processing system 802, storage system 803, software 805, communication interface system 807, user interface system

808, and sensor interface system 809. Processing system 802 is operatively coupled with storage system 803, communication interface system 807, user interface system 808, and sensor interface system 809.

Processing system 802 loads and executes software 805 from storage system 803. Software 805 includes applications 820, which are representative of the processes, services, and platforms discussed with respect to the included Figures. When executed by processing system 802 to establish initial optical communication links with first satellites among a constellation of satellites in orbit, monitor angular states of the optical communication links, and responsive to the angular states indicating at least one optical communication link reaching an exclusion range, establish subsequent optical communication links with second satellites that avoids the exclusion range, among other services, software 805 directs processing system 802 to operate as described herein for at least the various processes, operational scenarios, and sequences discussed in the foregoing implementations. Control system 800 may optionally include additional devices, features, or functionality not discussed for purposes of brevity.

Referring still to FIG. 8, processing system 802 may comprise a micro-processor and processing circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions comprising applications 820 and operating system 821 that provide control of a constellation of satellites and optical communications between the satellites, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include applications 820. Software 805 may also comprise firmware or some other form of machine-readable processing instructions executable by processing system 802.

Software 805, when loaded into processing system 802 and executed, may transform a suitable apparatus, system, or device (of which control system 800 is representative) overall from a general-purpose computing system into a special-purpose computing system customized to provide control of a constellation of satellites and optical communications between the satellites, among other services. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors. For example, if the computer-readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 820 can include communications control system 830 and orbit control system 840. Communications control system 830 includes instrumentation sensor interface 831, communications protocol control interface 832, and telemetry 833. Orbit control system 840 includes trajectory control interface 841, avionics control interface 842, and telemetry 843.

Turning first to communications control system 830, instrumentation sensor interface 831 is configured to communicate with elements of a satellite, such as optical sensors, radiation sensors, solar panels or arrays, or other sensing equipment. Communications protocol control interface 832 is configured to establish a communication network among a constellation of satellites in orbit. Communications protocol control interface 832 can direct operation of an on-board laser communication system or optical elements to establish optical communication links between other satellites among the constellation and/or a ground terminal. Telemetry 833 can be configured to collect telemetry and ephemeris data for operating a communication network among the constellation of satellites.

Turning next to orbit control system 840, trajectory control interface 841 is configured to determine indications of ephemeris, such as current and projected position and/or velocity of a satellite during orbit, among other motions and indications. Avionics control interface 842 is configured to enable operation of flight instruments and other onboard electronics and instruments during orbit, such as sensors, accelerometers, and other elements. Telemetry 843 utilizes the suite of instrumentation onboard a satellite controlled by avionics control interface 842 to communicate with other satellites and/or terminals.

Communication interface system 807 may include communication connections and devices that allow for communication with other on-satellite computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 807 can provide collection control, payload operations control and routing protocol control to satellites among a constellation, or other devices.

Communication interface system 807 may include portions of sensor system interface 809. Sensor system interface 809 comprises various hardware and software elements for interfacing with satellite instrumentation, avionics, sensors, or other devices. For example, sensor system interface 809 can receive or obtain solar radiation telemetry data, ephemeris indications, or other data. Data processing elements or other equipment can be included in sensor system interface 809.

Communication between communication control system 800 and other on-satellite elements or systems (not shown), may occur over communication links or communication networks and in accordance with various communication protocols, combinations of protocols, or variations thereof. For example, communication control system 800 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc. . . . ), the transmission control protocol (TCP), and the user datagram protocol (UDP), as well as any other suitable communication protocol, variation, or combination thereof.

User interface system 808 may include a software or virtual interface such as a terminal interface, command line interface, or application programming interface (API). User interface system 808 may also include physical user interfaces for use during ground configuration or pre-launch activities, such as a keyboard, a mouse, a voice input device, or a touchscreen input device for receiving input from a user. User interface system 808 may include telemetry interfaces, communication command controls, and solar collection controls. Output devices such as displays, web interfaces, terminal interfaces, and other types of output devices may also be included in user interface system 808. User interface system 808 can provide output and receive input over a network interface, such as communication interface system 807. In network examples, user interface system 808 might packetize data for receipt by a display system or computing system coupled over one or more network interfaces. User interface system 808 may comprise API elements for interfacing with users, other data systems, other user devices, web interfaces, and the like. User interface system 808 may also include associated user interface software executable by processing system 802 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
in a first satellite among a constellation of satellites, establishing an optical communication link with a second satellite among the constellation of satellites;
in the first satellite, determining an angular state of the optical communication link resultant from orbital motion of the first satellite with respect to the second satellite;
responsive to the angular state reaching an exclusion range established to avoid obscuration of the optical communication link from solar incidence, in the first satellite, initiating a subsequent optical communication link with a third satellite among the constellation of satellites that avoids aiming optics to within the exclusion range.

2. The method of claim 1, wherein the second satellite and the third satellite are selected among non-adjacently positioned satellites and adjacently positioned satellites in the constellation of satellites.

3. The method of claim 1, wherein indications of ephemeris associated with the constellation of satellites are employed to determine the angular state of the optical communication link.

4. The method of claim 3, comprising:
based on the angular state, in the first satellite, determining pointing angles for optical elements that establish the present cross-connect configuration.

5. The method of claim 1, comprising:
in the first satellite, establishing an intermediate connection configuration during transition from the optical communication link to the subsequent optical communication link that comprises concurrent use of at least a portion of the optical communication link and a portion of the subsequent optical communication link.

6. The method of claim 1, wherein the exclusion range comprises a range of approximately 20 to 50 degrees offset from a direction of the solar incidence.

7. The method of claim 1, wherein the first satellite comprises a solar panel oriented generally perpendicular to the solar incidence throughout the orbital motion independent of the angular state of the optical communication link.

8. A satellite, comprising:
an optical communication system configured to establish an optical communication link with at least one other satellite among a constellation;
wherein the at least one other satellite is selected based on orbital motion of the constellation and to avoid directing the optical communication link into an angular exclusion range established to avoid obscuration of the optical communication link from solar incidence.

9. The satellite of claim 8, wherein, responsive to determining that an angular state of at least a portion of the optical communication link reaches the angular exclusion range, the optical communication system is configured to establish a subsequent optical communication link with at least one other satellite among the constellation;
wherein the at least one other satellite is selected to avoid aiming optics forming the subsequent optical communication link into the angular exclusion range.

10. The satellite of claim 9, wherein the optical communication system is configured to obtain indications of ephemeris used to at least determine the angular state of the optical communication link.

11. The satellite of claim 9, wherein during transition between the optical communication link and the subsequent optical communication link, the optical communication system is configured to establish concurrent use of at least a portion of the optical communication link and a portion of the subsequent optical communication link.

12. The satellite of claim 8, wherein the angular exclusion range comprises a range of approximately 20 to 50 degrees offset from a direction of the solar incidence.

13. The satellite of claim 8, wherein the at least one satellite and the at least one other satellite comprise non-adjacently positioned satellites among the constellation.

14. The satellite of claim 8, comprising:
a solar panel oriented generally perpendicular to the solar incidence throughout the orbital motion independent of pointing directions of the optical communication link.

15. An apparatus, comprising:
one or more computer-readable storage media;
program instructions stored on the one or more computer-readable storage media executable by a processing device to direct the processing device to at least:
establish an optical communication link with a satellite among a constellation of satellites;
determine an angular state of the optical communication link resultant from orbital motion with respect to the satellite;
responsive to the angular state reaching an exclusion range established to avoid obscuration of the optical communication link from solar incidence, initiate a subsequent optical communication link with another satellite among the constellation of satellites that avoids aiming optics to within the exclusion range.

16. The apparatus of claim 15, wherein during transition between the optical communication link and the subsequent optical communication link, the program instructions further direct the processing device to establish concurrent use of at least a portion of the optical communication link and a portion of the subsequent optical communication link.

17. The apparatus of claim 15, wherein the satellite and the other satellite comprise non-adjacently positioned satellites among the constellation.

18. The apparatus of claim 15, wherein indications of ephemeris associated with the satellite and the other satellite are employed to determine the angular state of the optical communication link and the subsequent optical communication link.

19. The apparatus of claim 18, comprising:
based at least on the angular state, the program instructions further direct the processing device to determine pointing angles for optical elements that establish the optical communication link and the subsequent optical communication link.

20. The apparatus of claim 15, wherein the exclusion range comprises a range of approximately 20 to 50 degrees offset from a direction of solar incidence.

* * * * *